Oct. 20, 1970  A. H. BOYSON  3,535,567
ELECTRICAL GENERATOR WITH ROTATING PRINTED CIRCUIT
MOUNTED RECTIFIER ASSEMBLY
Filed March 2, 1967  3 Sheets-Sheet 3
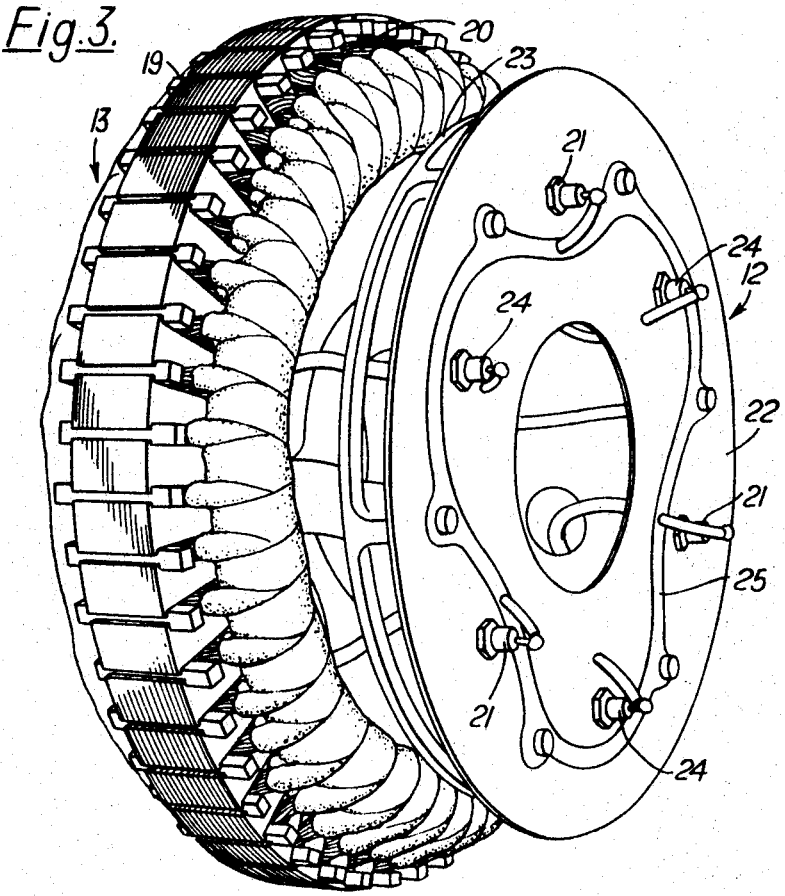
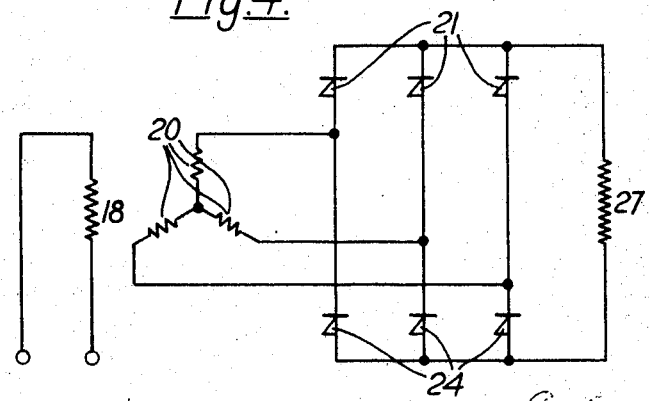

United States Patent Office 3,535,567
Patented Oct. 20, 1970

3,535,567
ELECTRICAL GENERATOR WITH ROTATING PRINTED CIRCUIT MOUNTED RECTIFIER ASSEMBLY
Ambrose Herbert Boyson, Wolverhampton, England, assignor to Electric Construction (W'Ton), Limited, Wolverhampton, England, a British company
Filed Mar. 2, 1967, Ser. No. 620,023
Claims priority, application Great Britain, Mar. 3, 1966, 9,418/66
Int. Cl. H02k *11/00*
U.S. Cl. 310—68                                2 Claims

ABSTRACT OF THE DISCLOSURE

An alternating current generator incorporating a main A.C. generator, an A.C. exciter and a rectifier. A.C. induced in the exciter armature by means of the exciter D.C. field system is rectified in the rectifier and used to energise the rotor of the main generator. The exciter and the main generator have substantially the same overall diameter, this being made possible by reason of a laminated structure in the D.C. field system. In addition to enabling both the main generator and the exciter to be housed within a common generally cylindrical housing, the axial length of the whole assembly is considerably reduced leading to improved space utilisation.

---

This invention relates to alternating current generators in which a main generator, that is to say an alternator, is excited by means of a direct current excitation system. Conventional A.C. generators are subject to a number of disadvantages which can be eliminated in constructions in accordance with the present invention.

According to the present invention the D.C. excitation system in such a generator comprises an A.C. exciter having a D.C. field system assembled from annular laminations defining salient poles, the number of which is such that the frequency of the current induced in the exciter armature is higher than that generated by the main generator, this current being rectified by a rectifier carried by the generator main shaft which carries the armature and the main generator rotor, and in which the main generator and the exciter have substantially the same overall diameter by reason of the manner of use of the active material in the exciter. In other words the generator main shaft is common to the exciter and the main generator and also carries the rectifier, the rectified current from which is used to energise the main generator rotor.

In an A.C. generator the overall diameter of the main generator is substantially fixed by the rated output. Since in constructions in accordance with the present invention the exciter has substantially the same overall diameter, both machines can be housed with good space utilisation in a common generally cylindrical housing. As, moreover, the axial length of a generator in accordance with the invention can be made relatively short, the generator will then be compact and in fact considerably more so than an equivalent conventional A.C. generator, this being very advantageous. This is due to the use of the laminated structure for the D.C. field system, this facilitating the incorporation of a relatively large number of poles in the field system without increasing the overall diameter of the exciter substantially above that of the main generator. It should be noted that in the exciter the number of poles is proportional to the frequency of the A.C. induced in the armature and this frequency itself is inversely proportional to the amount of active material required in the exciter armature, i.e. sheet steel and copper for the windings. Thus the greater the number of poles, so the smaller is the amount of active material utilised, this resulting particularly in a reduction in the axial length of the exciter. In this context it can be shown that the effect of doubling the frequency of the induced alternating current enables the amount of copper required for the exciter armature windings to be reduced by more than half. In addition to the corresponding reduction in axial length, costs are naturally reduced. Furthermore the low flux level associated with a large number of poles enables the exciter armature to have a small core, this also assisting in the provision of a short axial length exciter.

Attempts have been made for many years to reduce the axial length of A.C. generators without increasing the overall diameter. That these attempts have not in general been successful is at least partially due to the difference in size between the main generator and the conventional exciter. Normally the latter is a D.C. shunt machine which has a smaller overall diameter than that of the main generator but a quite appreciable axial length. On the other hand the provision of a conventional A.C. machine (together with a rectifier) could result in a generator of quite short axial length. However each of the pole-pieces which constitute the salient poles in a conventional A.C. machine is individually secured to a supporting framework. Where there are a large number of pole-pieces, this becomes difficult particularly if the pole-pieces are fairly small. Accordingly it is normal practice to increase the overall diameter so as to simplify attachment of the pole-pieces. For reasons already given, it is desirable that the frequency generated by the exciter should be fairly high thus requiring a considerable number of pole pieces and hence a fairly large overall diameter exciter. Accordingly a conventional A.C. machine capable of producing a high frequency would have a considerably greater overall diameter than that of the main generator.

Other advantages result from constructions in accordance with the invention. In particular as the exciter field is particularly well matched to the main generator, only a very small amount of auxiliary equipment, such as regulating equipment, is required. Furthermore it is found in practice that energy is stored in the A.C. field winding leading to improved performance if the generator is subjected to transient load conditions or overloads.

Preferably the exciter armature carries a number of phases wound with a short-pitched lap winding as the small overhang of this type of winding contributes to reducing the exciter axial length. Moreover for the same reason it is preferable that the rectifier should be in the form of an assembly carried on a printed-circuit heat sink, the armature and the rectifier assembly being closely coupled mechanically and electrically.

As far as the number of salient poles in the D.C. field system and the intended operating speed of the generator are concerned it is preferable that these should be such that on operation, the frequency of the A.C. is in the range of from 100 to 1000 c./s. Particularly good results have been achieved with a frequency of 200 c./s., this being produced by means of a sixteen pole D.C. field system, the exciter armature being rotated at 1500 r.p.m.

Although it is preferable that the overall diameter of the exciter and the main generator should be identical in order to facilitate the construction of the housing, this is not essential and minor deviations from this are naturally permissible, for instance up to 20% of the overall diameter.

By way of example an A.C. generator in accordance with the invention will now be described in more detail with reference to the accompanying drawings in which:

FIG. 3 is a perspective view of the exciter armature and rectifier assembly which are incorporated in the generator; and FIG. 4 is an electrical circuit diagram of the generator excitation system.

The illustrated generator is capable of delivering up to 50 kw. at 415 volts, 50 c./s., 3 phase and has a normal running speed of 1500 r.p.m. It has an overall length of 0.745 metre (excluding the projecting main shaft) and an overall diameter of 0.5 metre.

Figure 1:
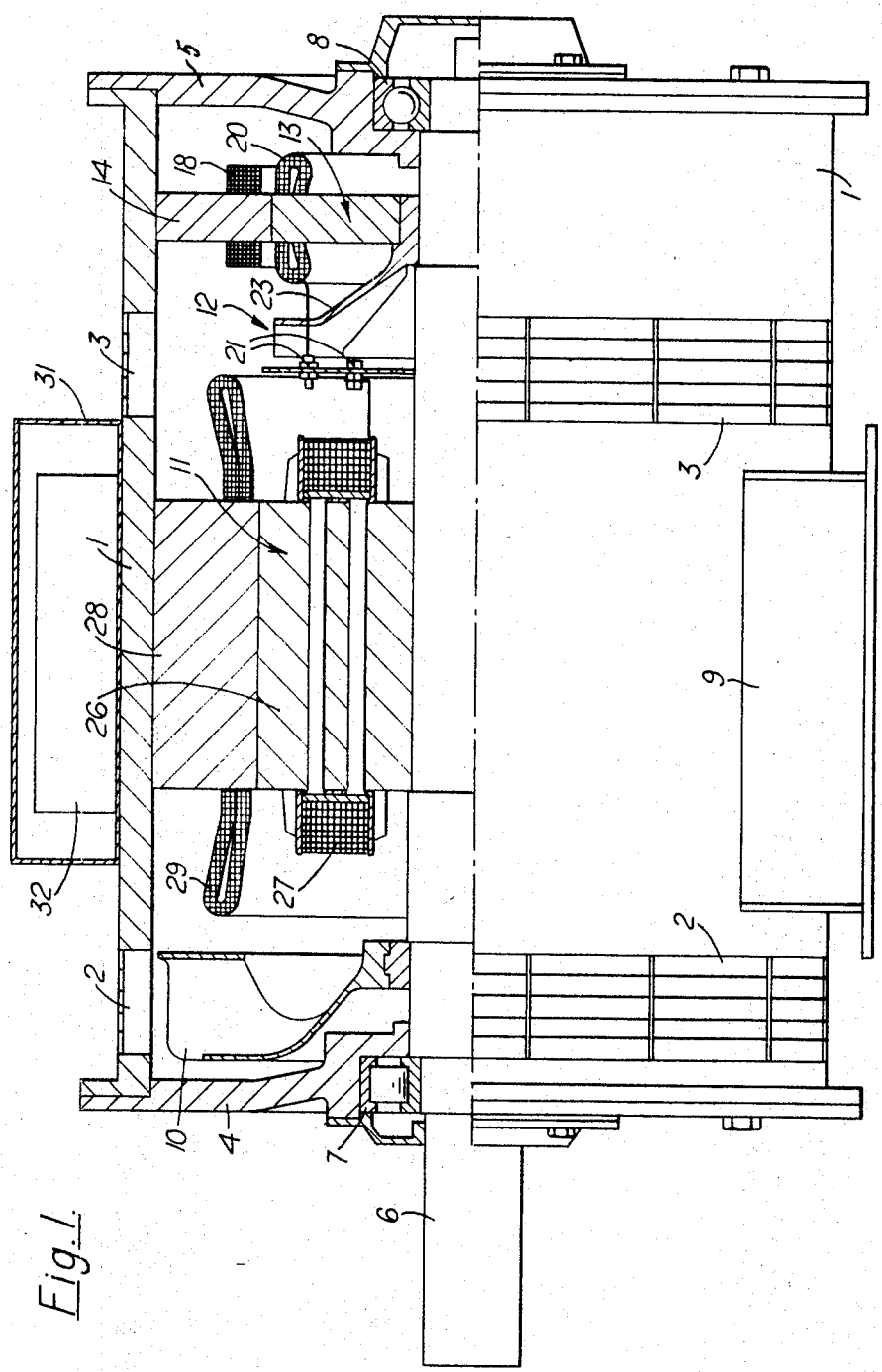
FIG. 1 is a side elevation partly in cross-section of the generator.

Reference should first be made to FIG. 1, the upper part of which is in cross-section to show the internal arrangement of the generator. As evident it has a generally cylindrical housing 1 of rolled steel in which are ventilation openings 2 and 3. End plates 4 and 5 are secured to respective ends of the housing and carry heavy duty bearings for the main shaft 6. The end plate 4 carries a roller bearing 7 while the end plate 5 carries a ball-race bearing 8. The generator is intended for floor mounting and for this purpose has an integral support bracket 9. A terminal box 31 in which a solid state automatic voltage regulator 32 is located is secured to the top of the housing.

The main shaft 6 carries a balanced aluminium fan 10, the rotor 11 of the main generator or alternator as it will be called, a rectifier assembly 12, and the armature 13 of the generator exciter. Each of these components will be described in turn commencing with the exciter for which purpose reference should also be made to FIGS. 2 and 3.

Figure 2:
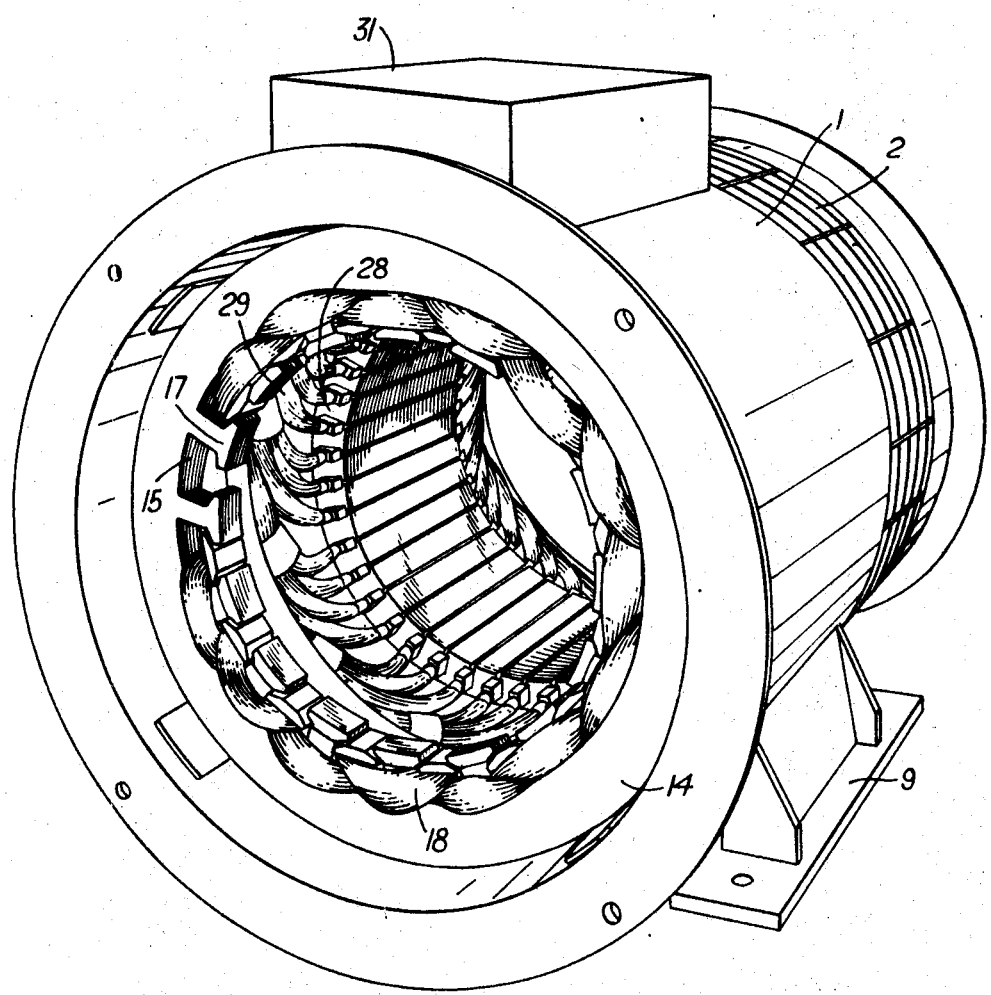
FIG. 2 is an end perspective view of the generator with the rotating parts removed.

The exciter has a D.C. field system which is secured within the inside of the housing 1 and includes a laminated structure 14. This structure is 2.5 cm. thick and consists of eighteen identical annular steel laminations (i.e. stampings) sandwiched together and clearly indicated at 15 in FIG. 2. During the stamping operation sixteen parts of the inner periphery are removed so as to leave sixteen inwardly extending generally T shaped parts indicated at 17. These parts 17 constitute salient poles being energised by means of a multiple turn winding 18 to give eight North and eight South poles. As shown in FIG. 2, the winding 18 has been removed from the salient pole 17 and the adjacent pole in order to show the shape of these poles.

The exciter armature 13, best seen in FIG. 3, is formed from a number of identical steel stampings 19 which carry a two-layer short-pitched lap winding 20 of three-phase type carried in forty-eight slots. The electrical circuit is as shown in FIG. 4 from which it can be seen that the winding 20 is electrically connected to the rectifier assembly 12, this incorporating six bridge connected silicon rectifiers shown as 21 and 24. An annular copper plated insulating plate 22 which acts as a heat sink carries the rectifiers and is closely secured or coupled to the exciter armature 13 by means of a supporting structure 23. As is clear from FIG. 4 the cathodes of the rectifiers 21 are electrically separate from the anodes of the rectifiers 24. To achieve this, a part of the copper plating on the plate 22 is etched away in the manner of a printed circuit to leave a circular insulating path 25 which serves to electrically insulate the three rectifiers 21 from the three rectifiers 24.

The electrical output from the rectifier assembly is supplied to the alternator rotor 11. This comprises a number of cruciform shaped steel stampings 26 on which the field winding 27 is wound, this serving to produce two North and two South poles. The alternator stator is also formed of steel stampings indicated at 28 and carrying a star connected, two-layer, short pitched lap winding 29. As is clear from FIG. 1 the overall diameter of the alternator stator stampings 28 and the exciter field system stampings 14 is identical.

In use the main shaft 6 is rotated at 1500 r.p.m. by a suitable prime mover and the D.C. field winding 18 energised from a suitable supply or by the solid state automatic voltage regulator, the laminated structure of the D.C. field system being particularly suited to such a regulator. The D.C. field produced by this winding induces a three-phase alternating current having a frequency of 200 c./s. in the exciter armature winding 20. This alternating current is rectified by the six silicon rectifiers 21 and 24 and the resulting direct current energises the alternator rotor winding 27. This has the effect of inducing a three-phase alternating current having a frequency of 50 c./s. and a voltage of 415 volts in the alternator stator winding 29.

The fan 10 draws air in through the ventilation opening 2, the air then flowing axially to cool the alternator and rectifier assembly before passing out of the ventilation opening 3. The fact that the rectifier assembly rotates naturally assists in its cooling.

I claim:
1. An A.C. generator comprising:
    a stator;
    an output winding carried by said stator;
    a rotor mounted for rotation within said stator;
    a field winding carried by said rotor;
    a D.C. field structure carrying an exciter winding;
    an exciter armature mounted for coaxial rotation with said rotor, within said field structure;
    an armature winding carried by said armature;
    an insulating disc having a surface carrying a printed circuit consisting of two conductive areas of substantially annular configuration and radially separated from each other by an electrically insulating area; and
    a plurality of static rectifiers having bodies mounted on and extending through said disc, each of said conductive areas having mounted therein an equal number of said rectifiers, said conductive areas connecting said rectifiers in a bridge network said network being connected to rectify A.C. generated in said armature winding and to supply D.C. to said field winding.
2. An A.C. generator according to claim 1 in which said disc is removably secured directly to said armature to form a dismountable integral unit.

References Cited
UNITED STATES PATENTS

| | | | |
|---|---|---|---|
| 3,363,122 | 1/1968 | Hoover et al. | 310—68 |
| 3,359,438 | 12/1967 | Hylen | 310—68 |
| 3,283,219 | 11/1966 | Keady. | |
| 3,177,387 | 4/1965 | Leischner | 310—112 X |
| 3,173,038 | 3/1965 | Brawn | 310—68 |
| 3,146,362 | 8/1964 | Bates et al. | 310—68 |
| 3,010,040 | 11/1961 | Braun | 310—112 |
| 2,722,652 | 11/1955 | Brainard | 310—68.4 X |
| 2,634,379 | 4/1953 | Brainard | 310—112 X |
| 2,414,287 | 1/1947 | Crever | 310—68.4 X |
| 3,412,271 | 11/1968 | Hall | 310—68 |
| 3,329,840 | 7/1967 | Binder | 310—68 |
| 3,271,601 | 9/1966 | Raver | 310—68 |
| 2,897,383 | 7/1959 | Barrows et al. | 310—68 |
| 3,001,121 | 9/1961 | Kerr | 310—68.4 |
| 3,250,929 | 5/1966 | Maier | 310—68 |
| 3,368,091 | 2/1968 | Layman | 310—68 |

MILTON O. HIRSHFIELD, Primary Examiner

MARK O. BUDD, Assistant Examiner